US010983269B1

(12) United States Patent
D'Urso et al.

(10) Patent No.: US 10,983,269 B1
(45) Date of Patent: Apr. 20, 2021

(54) OPTICAL FIBERS WITH TWO METAL COATINGS SURROUNDING THE CLADDING

(71) Applicant: Verrillon, Inc., North Grafton, MA (US)

(72) Inventors: John D'Urso, Shrewsbury, MA (US); William Paul Jacobsen, Bolton, CT (US)

(73) Assignee: VERRILLON, INC., North Grafton, MA (US)

( * ) Notice: Subject to any disclaimer, the term of this patent is extended or adjusted under 35 U.S.C. 154(b) by 0 days.

(21) Appl. No.: 16/590,782

(22) Filed: Oct. 2, 2019

(51) Int. Cl.
*G02B 6/02* (2006.01)
*C03C 25/46* (2006.01)
*C03C 25/1065* (2018.01)
*C25D 7/06* (2006.01)
*C03C 25/62* (2018.01)
*C25D 3/50* (2006.01)

(52) U.S. Cl.
CPC ...... *G02B 6/02395* (2013.01); *C03C 25/1068* (2018.01); *C03C 25/46* (2013.01); *C03C 25/62* (2013.01); *C25D 3/50* (2013.01); *C25D 7/0607* (2013.01)

(58) Field of Classification Search
CPC . G02B 6/02395; C03C 25/1068; C03C 25/62; C03C 25/46; C25D 3/50; C25D 7/0607
USPC ........................................................ 385/123
See application file for complete search history.

(56) References Cited

U.S. PATENT DOCUMENTS

| 4,089,585 | A | * | 5/1978 | Slaughter ................. G02B 6/02 385/113 |
| 4,390,589 | A | | 6/1983 | Geyling et al. |
| 4,407,561 | A | * | 10/1983 | Wysocki ............ C03C 25/1061 385/128 |
| 4,418,984 | A | * | 12/1983 | Wysocki ............. G02B 6/4402 385/127 |
| 4,592,932 | A | | 6/1986 | Biswas et al. |
| 4,609,437 | A | | 9/1986 | Kruishoop et al. |
| 5,093,880 | A | * | 3/1992 | Matsuda ................. C25D 3/38 385/100 |
| 5,380,559 | A | | 1/1995 | Filas et al. |
| 5,774,615 | A | | 6/1998 | Uda et al. |
| 6,572,743 | B2 | | 6/2003 | Miller et al. |
| 7,063,779 | B2 | | 6/2006 | Onosato |
| 8,693,825 | B2 | | 4/2014 | Sugrim et al. |
| 9,235,004 | B2 | | 1/2016 | Bansal et al. |

(Continued)

FOREIGN PATENT DOCUMENTS

WO    WO-2003069390 A1    8/2003

OTHER PUBLICATIONS

International Search Report and Written Opinion for PCT/US2020/053834 dated Dec. 23, 2020.

*Primary Examiner* — John Bedtelyon
(74) *Attorney, Agent, or Firm* — Goodwin Procter LLP (57) ABSTRACT

An optical fiber and a method of fabrication thereof. The optical fiber includes a core; a cladding surrounding the core; a primary metal coating surrounding the cladding and including a noble metal having a melting point of at least 500 degrees Celsius; and a secondary metal coating surrounding the primary coating and having a melting point higher than the melting point of the primary metal coating, a thickness of the primary metal coating being greater than a thickness of the secondary metal coating.

19 Claims, 5 Drawing Sheets

(56) References Cited

U.S. PATENT DOCUMENTS

| | | | |
|---|---|---|---|
| 9,255,821 | B1 | 2/2016 | Miyamoto et al. |
| 9,599,769 | B2 | 3/2017 | Jacobsen et al. |
| 9,798,080 | B2 | 10/2017 | Miyamoto et al. |
| 10,126,493 | B2 | 11/2018 | Miyamoto et al. |
| 2003/0039458 | A1 | 2/2003 | Miller et al. |
| 2008/0273852 | A1 | 11/2008 | Parker et al. |
| 2009/0162647 | A1* | 6/2009 | Sun .................. H01J 37/32477 428/336 |
| 2010/0027949 | A1 | 2/2010 | Bringuier et al. |
| 2014/0321798 | A1* | 10/2014 | Chen ................... G01N 21/774 385/12 |
| 2015/0235742 | A1 | 8/2015 | Fu et al. |
| 2015/0284833 | A1* | 10/2015 | Hsiao ....................... C23C 4/08 428/332 |
| 2016/0231523 | A1 | 8/2016 | Arora et al. |
| 2017/0276869 | A1* | 9/2017 | Setmire ................ G02B 6/4436 |
| 2017/0285261 | A1* | 10/2017 | Miyamoto .......... C23C 18/1653 |
| 2017/0351023 | A1* | 12/2017 | Alkeskjold ......... C03B 37/0279 |
| 2019/0079255 | A1 | 3/2019 | Miyamoto et al. |

* cited by examiner

OPTICAL FIBERS WITH TWO METAL COATINGS SURROUNDING THE CLADDING

FIELD OF THE INVENTION

In various embodiments, the invention relates generally to optical fibers, and more particularly to optical fibers with metal coatings.

BACKGROUND

The amount of light that is lost (the "attenuation" of light) as a signal travels through an optical fiber is central to the utility of the optical fiber. The lower the attenuation, the more useful the optical fiber is for long distance or bend-sensitive applications. However, signal attenuation is common in metal-coated optical fibers, especially following thermal cycling. Specifically, optical fibers can demonstrate large increases in signal attenuation following thermal cycling because the coefficient of thermal expansion of metal is much higher than that of glass, and the inelastic deformation of the metal causes microbends in the fiber. In addition, metal-coated optical fibers can cold weld to a protective metal tube, which also increases attenuation within the optical fiber due to the expansion/contraction of the protective metal tube. Moreover, if there are multiple metal-coated fibers in a tube, the metal-coated fibers can cold weld to each other, further increasing attenuation within the optical fiber.

A variety of solutions to alleviate this problem of cold welding in metal-coated fibers have been suggested. For example, one solution involves coating the metal-coated optical fiber with a layer of copper metal. However, copper is a corrodible metal that is easily oxidized. Oxidized metals such as copper are brittle and easily breakable, resulting in a brittle and breakable optical fiber coating. Alternative solutions include coating the metal-coated optical fiber with an oxidation-resistant metal layer, such as gold. However, when a metal tube is placed around a gold coated optical fiber, the gold coating can easily adhere to the tubing when heated, causing further attenuation within the optical fiber. Some solutions have attempted to circumvent this problem of gold sticking to surrounding tubing by coating the metal-coated optical fiber with a powder (e.g., talc powder) prior to enclosure in the tubing. However, this solution is rudimentary and sometimes ineffective because the powder is easily displaceable.

Therefore, improved solutions for reducing or eliminating cold welding of metal-coated optical fibers during thermal cycling, and thus to reducing cold welding-induced attenuation in metal-coated optical fibers, are needed.

SUMMARY

In one aspect, the embodiments of the invention relate to an optical fiber including a core having a central axis, the core including a silica-based glass and having a refractive index. A cladding region surrounds the core, the cladding including a silica-based glass and having a refractive index less than the refractive index of the core. A primary metal coating surrounds the cladding, the primary metal coating including a noble metal having a melting point of at least 500 degrees Celsius, and a secondary metal coating surrounds the primary metal coating, the secondary metal coating having a melting point higher than the melting point of the primary metal coating. A thickness of the primary metal coating is greater than a thickness of the secondary metal coating.

One or more of the following features may be included. The primary metal coating may have a thickness selected from a range of 0.5 microns to 45 microns, e.g., 0.5 microns to 30 microns.

The secondary metal coating may have a thickness selected from a range of 0.005 microns to 2 microns. The secondary metal coating may have a melting point of at least 900 degrees C.

The secondary metal coating may be porous.

The noble metal may include gold, ruthenium, rhodium, palladium, silver, osmium, iridium, platinum, and/or any alloy thereof.

The secondary metal coating may include a metal containing at least 60 wt % of a noble metal or any alloy thereof.

The primary metal coating may have a Vickers hardness of less than or equal to 550 MPa.

The secondary metal coating may have a Vickers hardness of greater than 220 MPa.

The secondary metal coating may include a metal alloyed with phosphorus. It may include a tungsten alloy and/or a metal oxide.

The secondary metal coating may have a solubility into the primary metal coating of less than 10% at 20 degrees Celsius. A tubing may surround the secondary metal coating.

In another aspect, embodiments of the invention relate to a method for fabricating an optical fiber, the method including placing the optical fiber including a core, a cladding, and a primary metal coating surrounding the cladding in a solution containing ions of a secondary metal, the solution contacting the primary metal coating of the optical fiber, and a melting point of the secondary metal being higher than a melting point of the primary metal. An electric current is supplied from the solution containing ions of the secondary metal to the primary metal coating of the optical fiber, thereby electrodepositing the ions of the secondary metal onto the primary metal coating to form a secondary metal coating surrounding the primary metal coating. The core includes a silica-based glass and has a refractive index. The cladding includes a silica-based glass and has a refractive index less than the refractive index of the core. The primary metal coating includes a noble metal having a melting point of at least 500 degrees Celsius. The secondary metal coating has a melting point higher than the melting point of the primary metal coating. A thickness of the primary metal coating is greater than a thickness of the secondary metal coating.

One or more of the following features may be included. The primary metal coating may have a thickness selected of 0.5 microns to 45 microns, e.g., 0.5 microns to 30 microns. The secondary metal coating may have a thickness of 0.005 microns to 2 microns. The secondary metal coating may have a melting point of at least 900 degrees C.

The secondary metal coating may include a metal containing at least 60 wt % of a noble metal or any alloy thereof.

BRIEF DESCRIPTION OF THE DRAWINGS

These and other features, aspects, and advantages of embodiments of the present invention will become better understood with regard to the following description, and accompanying drawings, where.

The figures depict various embodiments of the present invention for purposes of illustration only. One skilled in the art will readily recognize from the following discussion that alternative embodiments of the structures and methods illustrated herein can be employed without departing from the principles of the embodiments of the invention described herein.

DETAILED DESCRIPTION

Embodiments of the invention include an optical fiber having two metal coatings, configured to lower attenuation of the optical fiber. In particular, referring to FIG. 1, an optical fiber 100, in accordance with embodiments of the invention, includes a core 110, a cladding 120 surrounding the core 110, a primary metal coating 130 surrounding the cladding 120, and a secondary metal coating 140 surrounding the primary metal coating. Attenuation of the optical fiber 100 is reduced by selecting the material of the secondary metal coating 140 such that it has low diffusibility into the primary metal coating 130, while also preventing cold welding despite significant changes in temperature. Thus, the optical fiber 100 is configured to reduce attenuation therein.

Each of these components of the optical fiber 100 are discussed in turn below. In certain embodiments discussed in further detail below with regard to FIGS. 2-4, the optical fiber can further include one or more of a carbon layer and a seed layer.

Figure 1:
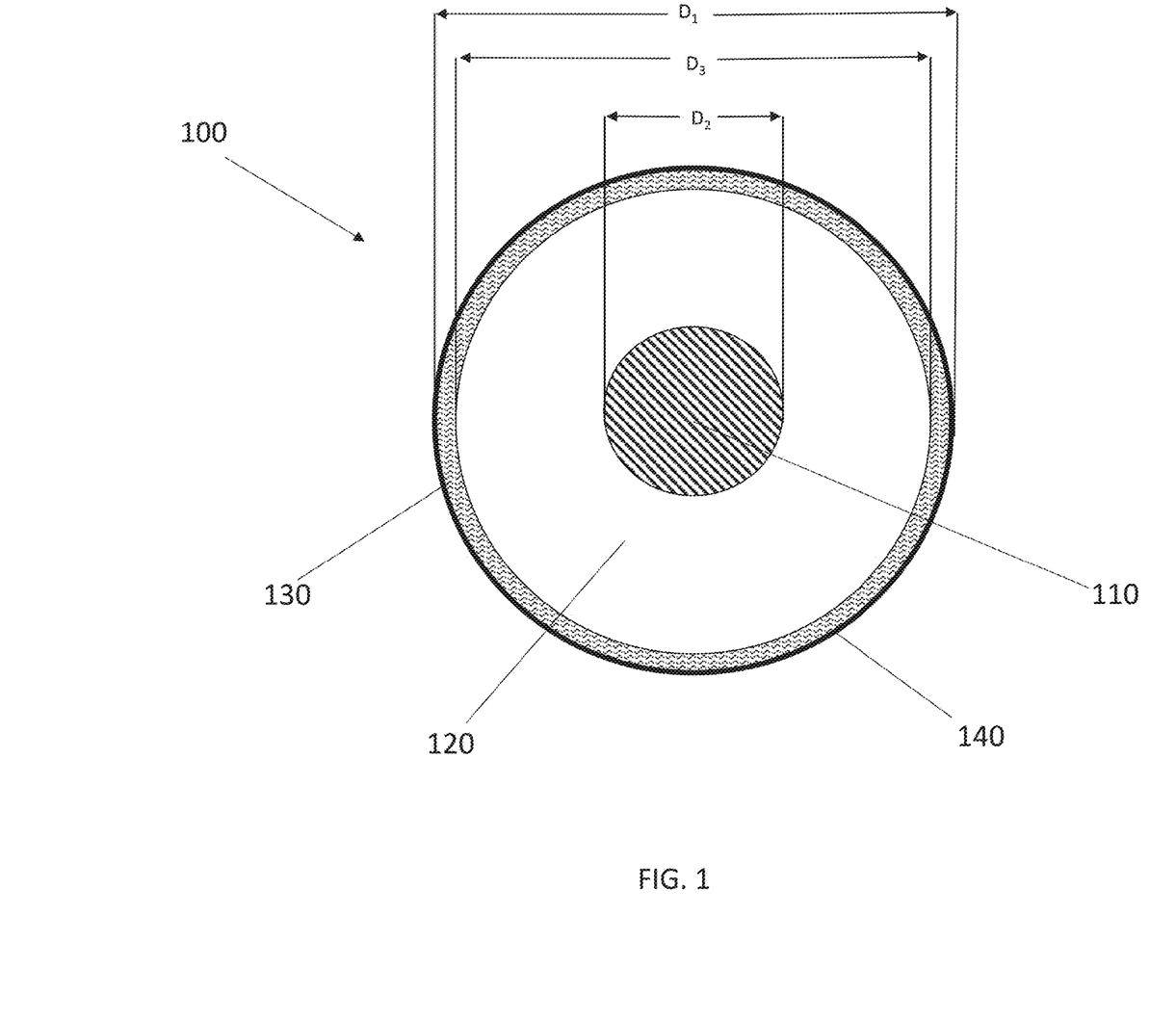
FIG. 1 illustrates a cross-section of an optical fiber in accordance with an embodiment of the invention.

The cross-section of the optical fiber 100 depicted in FIG. 1, including the core 110, the cladding 120, the primary metal coating 130, and the secondary metal coating 140, has a diameter of $D_1$. In some embodiments, the diameter $D_1$ of the cross-section of the optical fiber 100 ranges from 110 µm to 220 µm, e.g., 129 µm to 160 µm.

Turning first to the core 110 of the optical fiber 100, the core 110 has a central axis that is orthogonal to the cross-section of the optical fiber 100. The central axis of the core 110 extends along a length (not shown) of the optical fiber 100. The core 110 includes a silica-based glass, e.g., germanosilicate. and has a refractive index selected from a range of 1 to 2, e.g., 1.4 to 1.6, or e.g., 1.467.

The core 110 has a diameter of Dz. In some embodiments, the diameter $D_2$ of the core 110 is selected from a range of 4 µm to 100 µm, e.g., 20 µm to 80 µm.

The cladding 120 surrounds the core 110. Like the core 110, the cladding 120 includes a silica-based glass and has a refractive index. However, to help confine light within the core and to reduce attenuation within the optical fiber 100, the refractive index of the cladding 120 is less than the refractive index of the core 110. For example, cladding 120 may include silica doped with fluorine and have a refractive index selected from a range of 1 to 2, e.g., 1.4 to 1.6, or e.g., 1.452.

The core 110 and the cladding 120 may have a combined diameter of $D_3$. In some embodiments, the combined diameter $D_3$ of the core 110 and the cladding 120 typically ranges from 40 µm to 200 µm.

The primary metal coating 130 surrounds the cladding 120, and includes a noble metal having a melting point of at least 500 degrees Celsius. Appropriate noble metals include, e.g., gold, ruthenium, rhodium, palladium, silver, osmium, iridium, platinum, or any alloy thereof.

There are many advantages to forming the primary metal coating 130 of the optical fiber 100 from a noble metal as opposed to a non-noble metal. First, unlike non-noble metals such as aluminum and copper, noble metals are less reactive, and thus are less susceptible to corrosion via mechanisms such as oxidation reactions. Furthermore, noble metals are less brittle than non-noble metals, enabling easier formation of the primary metal coating 130 from noble metals, and rendering the primary metal coating 130 made from noble metals less breakable. Specifically, in some embodiments, the primary metal coating 130 can be a metal having a Vickers hardness of less than 550 MPa, e.g., less than or equal to 220 MPa. An advantage of using a material with such Vickers hardness is that it reduces mechanical stress on the glass portion of the optical fiber. In further embodiments, the primary metal coating 130 can be a metal having a ductility greater than or equal to 40%. This ductility may be advantageous because it preserves the mechanical integrity of the coating when wrapped in tight coils.

In addition to the advantages afforded by forming the primary metal coating 130 from a noble metal, there are further advantages to forming the primary metal coating 130 from a metal having a melting point of at least 500 degrees Celsius. Specifically, by forming the primary metal coating 130 from a metal having a melting point of at least 500 degrees Celsius, the optical fiber 100 is able to operate in conditions of up to 500 degrees Celsius without experiencing excessive inter-diffusion of the optical fiber 100. This resistance to inter-diffusion at such high temperatures further enables reduction of attenuation of the optical fiber 100.

In some embodiments, the primary metal coating 130 can include additional features to further reduce attenuation of the optical fiber 100. For instance, in certain embodiments, the primary metal coating 130 has a thickness selected from a range of 0.5 to 45 microns, e.g., 0.5 to 30 microns. At such a thickness, the primary metal coating 130 is sufficiently thick to encapsulate and protect the core 110 and cladding 120 of the optical fiber 100, but is sufficiently thin to avoid increased attenuation in the optical fiber 100 as a result of mechanical stress.

In some additional embodiments, to further reduce attenuation in the optical fiber 100 amidst thermal cycling, the primary metal coating 130 can have a coefficient of thermal expansion less than $25 \times 10^{-6}$ $K^{-1}$. With such a coefficient of expansion, the primary metal coating 130 reduces significant expansion and compression during thermal cycling, and reduces attenuation of the optical fiber 100 as a result of heating and cooling.

The secondary metal coating 140 surrounds the primary metal coating 130, and is a metal having a melting point higher than the melting point of the primary metal coating 130. Additionally, the secondary metal coating 140 has a thickness that is less than the thickness of the primary metal coating 130.

The secondary metal coating 140 serves to further reduce attenuation in the optical fiber 100. Specifically, the secondary metal coating 140, with its higher melting point relative to the melting point of the primary metal coating 130, does not cold weld to other metal-coated fibers or to a protective tube surrounding it, and does not diffuse into the primary metal coating 130 during heat treatment. For example, in some embodiments, the secondary metal coating 140 can be a metal having a melting point of at least 900 degrees Celsius. As a result, the secondary metal coating 140 does not easily diffuse into the primary metal coating 130 or into the cladding 120, and thereby helps reduce attenuation of the optical fiber 100.

Having the secondary metal coating 140 thinner than the primary metal coating 130 is not a mere design choice, Rather, the secondary metal coating 140 is preferably thinner than the primary metal coating in order to reduce the mechanical stress on both the primary metal coating and the glass underneath.

In some embodiments, the optical fiber 100 can further include an exterior tubing (not shown) surrounding the secondary metal coating 140. As mentioned above, compared to the primary metal coating 130, the secondary metal coating 140 does not cold weld or diffuse as easily during thermal cycling due to its higher melting point. Thus, the secondary metal coating 140 does not as easily stick to the tubing, as would the primary metal coating if it was the outer coating; accordingly, the presence of the secondary metal coating reduces attenuation of the optical fiber 100 in embodiments with exterior tubing, as well.

In some embodiments, the secondary metal coating 140 can include additional features to further reduce sticking and, thereby, attenuation of the optical fiber 100. For instance, in certain embodiments, the secondary metal coating 140 has a thickness selected from a range of 0.005 microns and 2 microns. At certain thickness values within this range, the secondary metal coating 140 can be porous. The porosity may be 95% or less, e.g., 50% or less.

In further embodiments, a ratio of the thickness of the primary metal coating 130 to the thickness of the secondary metal coating 140 can be 50:1 or greater, e.g., 100:1 or greater, or 200:1 or greater. At such thicknesses, the secondary metal coating 140 is sufficiently thick to serve as a barrier to the primary metal coating 130, but is sufficiently thin to prevent cold welding and reduce stress on the primary metal coating and the glass.

The metal that forms the secondary metal coating 140 can also be selected to reduce attenuation in the optical fiber 100. For example, the metal that forms the secondary metal coating 140 can be selected to be resistant to corrosion and/or to be ductile and resistant to breaking. For example, in some embodiments, the secondary metal coating 140 can be a metal containing at least 60 wt % of a noble metal or any alloy thereof. As discussed above, compared to non-noble metals, noble metals are less reactive, and thus are less susceptible to corrosion via mechanisms such as oxidation reactions. Furthermore, noble metals are less brittle than non-noble metals, enabling easier formation of the secondary metal coating 140 from noble metals, and rendering the secondary metal coating 140 made from noble metals less breakable. Specifically, in some embodiments, the secondary metal coating 140 can be a metal having a Vickers hardness of greater than 220 MPa, e.g., greater than 550 MPa. The hardness of the secondary metal coating 140 is preferably greater than a hardness of the primary metal coating 130. An advantage of using a material with such Vickers hardness is that it protects the primary metal coating underneath. In further embodiments, the secondary metal coating 140 can be a metal having a ductility greater than 30%, e.g., greater than 40%.

In addition to being resistant to corrosion and mechanical failure, the metal that forms the secondary metal coating 140 can also be selected based on its solubility with the primary metal coating 130. As discussed above, diffusion of the secondary metal coating 140 into the primary metal coating 130 may increase attenuation of the optical fiber 100. Thus, in some embodiments, the metal that forms the secondary metal coating 140 can be selected to have a low solubility with the metal that forms the primary metal coating 130. For example, in an embodiment in which gold is the primary metal coating 130, nickel may not be chosen as the secondary metal coating 140 because while nickel has a high melting point, nickel also has a high solubility with gold, and therefore is able to easily diffuse into gold. In certain embodiments, the secondary metal coating can have a solubility into the primary metal coating of less than 10% at 20 degrees Celsius.

In some additional embodiments, to further reduce attenuation in the optical fiber 100, the secondary metal coating 140 can have a coefficient of expansion less than $25 \times 10^{-6}$ $K^{-1}$. In some further embodiments, a ratio of coefficient of thermal expansion of the primary metal coating 130 to a coefficient of thermal expansion of the secondary metal coating 140 can be e.g., less than 1 to 3, e.g., 0.5:3 or less. With such coefficients of expansion, the secondary metal coating 140 experiences minimal expansion and compression during thermal cycling, and avoiding an increase in attenuation of the optical fiber 100 as a result of heating and cooling.

In alternative embodiments, the secondary metal coating 140 can be a metal alloyed with phosphorus, a tungsten alloy, or a metal oxide. The advantage of forming the secondary metal coating 140 out of these materials is added abrasion resistance and increased resistance to diffusion into the primary metal coating.

Figure 2:
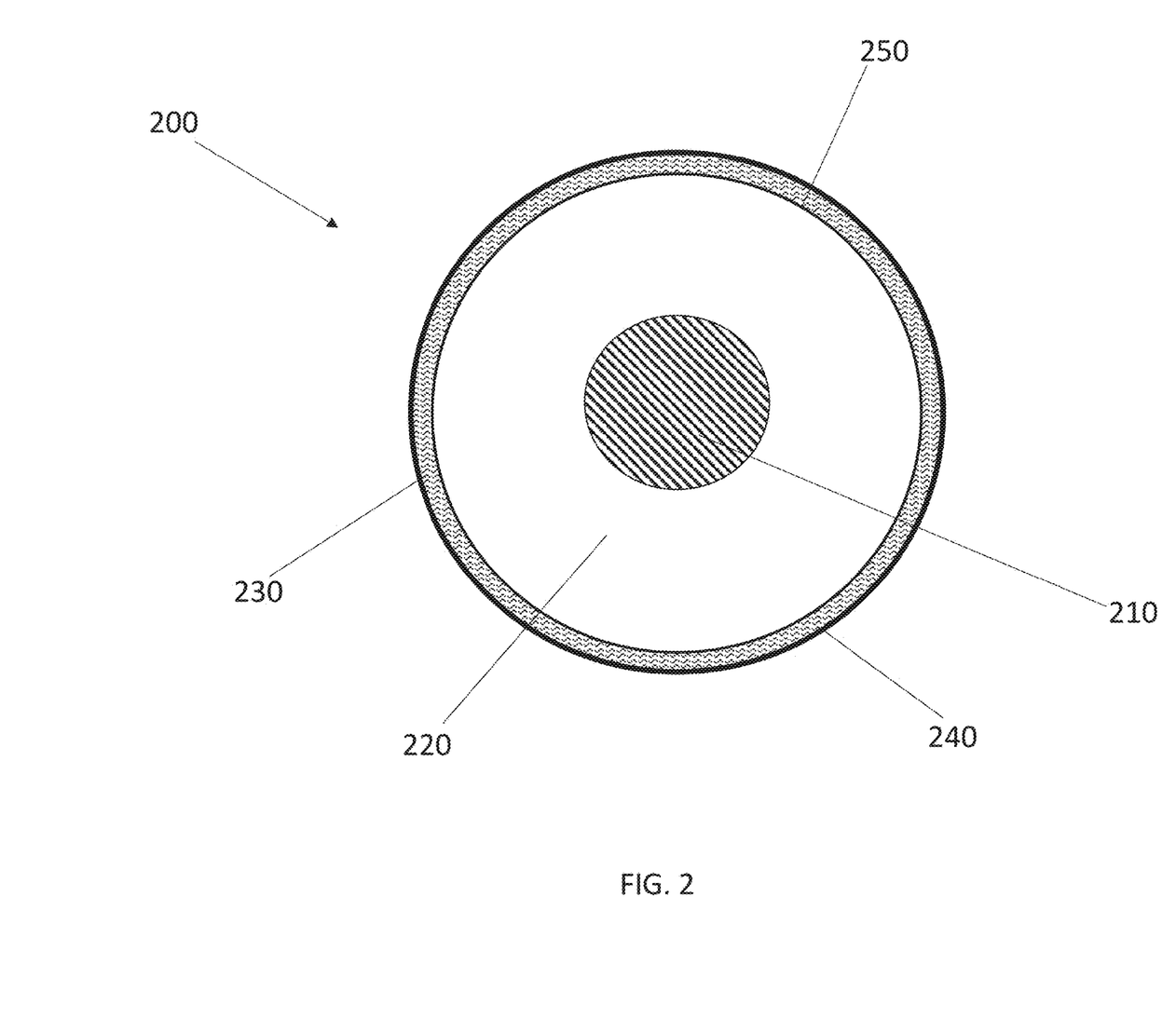
FIG. 2 illustrates a cross-section of an optical fiber in accordance with an embodiment of the invention.

As mentioned above, in certain embodiments, the optical fiber can optionally include one or more of a carbon layer and a seed layer. FIG. 2 illustrates a cross-section of an optical fiber 200 in accordance with an embodiment of the invention. The optical fiber 200 is configured to reduce attenuation within in the optical fiber 200 by having a secondary metal coating 240 with low diffusibility into the primary metal coating 230, while also preventing cold welding of the optical fiber 200 despite significant changes in temperature. Accordingly, the optical fiber 200 is configured to reduce attenuation therein.

The optical fiber 200 includes a core 210, a cladding 220, a primary metal coating 230, and a secondary metal coating 240 as described above with regard to FIG. 1. However, unlike the optical fiber 100 of FIG. 1, the optical fiber 200 of FIG. 2 further includes a carbon layer 250 deposited between the cladding 220 and the primary metal coating 230 of the optical fiber 200. The carbon layer 250 is a thin layer of carbon, and is an optional component of the optical fiber 200. The carbon layer 250 may provide an additional benefit of promoting electroless deposition and preventing water ingression. The carbon layer may have a thickness of 50 angstroms to 150 angstroms, e.g., 100 angstroms.

Figure 3:
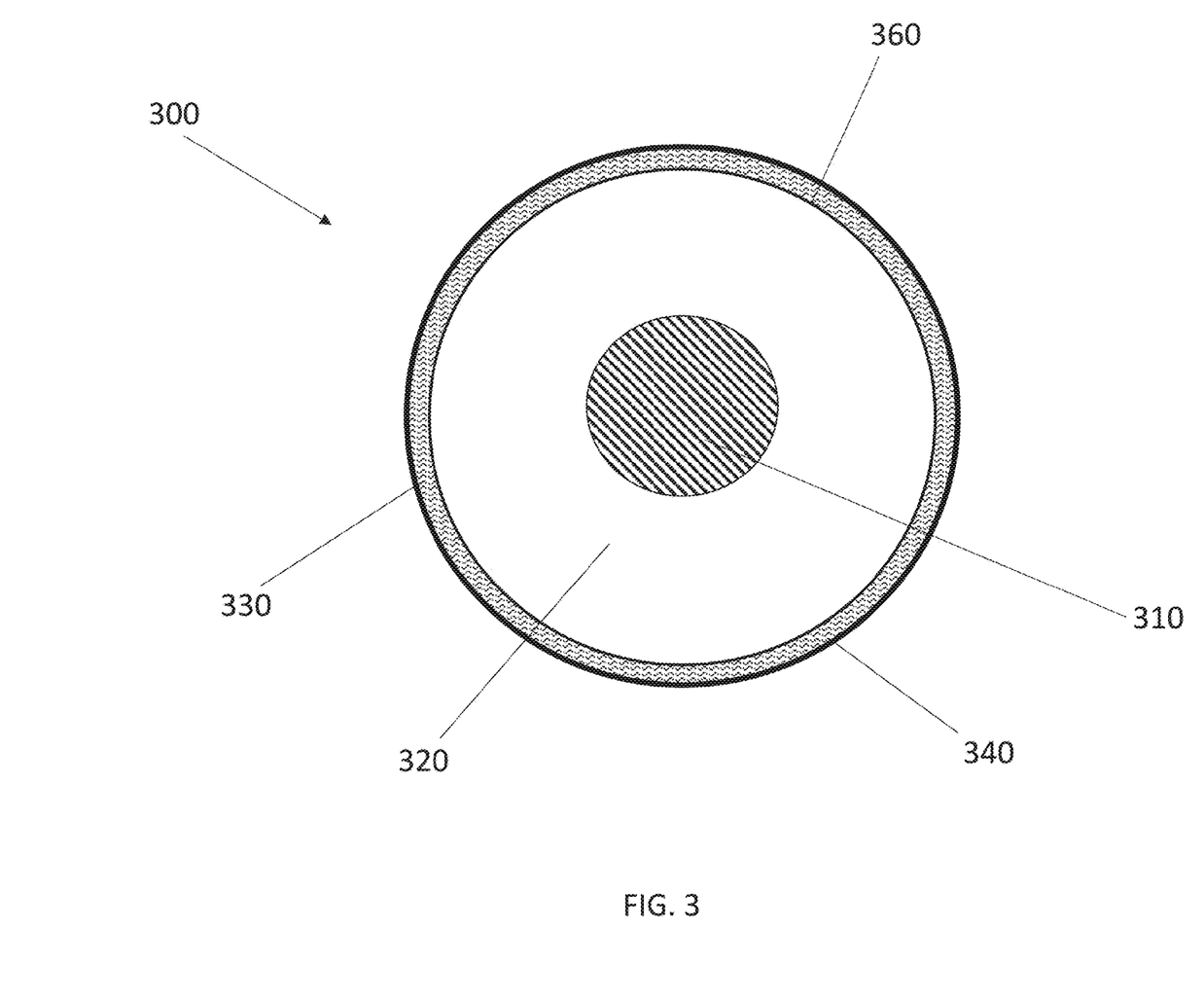
FIG. 3 illustrates a cross-section of an optical fiber in accordance with an embodiment of the invention.

FIG. 3 illustrates a cross-section of an optical fiber 300 in accordance with an embodiment of the invention. The optical fiber 300 is configured to reduce attenuation of in the optical fiber 300 by having a secondary metal coating 340 that resists diffusing into the primary metal coating 330, while also preventing cold welding of the optical fiber 300 despite significant changes in temperature. Accordingly, the optical fiber 300 is configured to reduce attenuation thereof.

The optical fiber 300 includes a core 310, a cladding 320, a primary metal coating 330, and a secondary metal coating 340 as described above with regard to FIG. 1. However, unlike the optical fiber 100 of FIG. 1, the optical fiber 300 of FIG. 3 further includes a seed layer 360 deposited between the cladding 320 and the primary metal coating 330 of the optical fiber 300. The seed layer 360 may be a thin layer of palladium, and is an optional component of the optical fiber 300. The seed layer 360 may provide an additional benefit of allowing the fiber to be electroplated. The seed layer may have a thickness of less than 1 μm, e.g., 0.5 μm. Palladium is an especially suitable material for the seed layer because it is a noble metal that is commonly deposited using electroless deposition. Other suitable materials for the seed layer are silver and gold.

Figure 4:
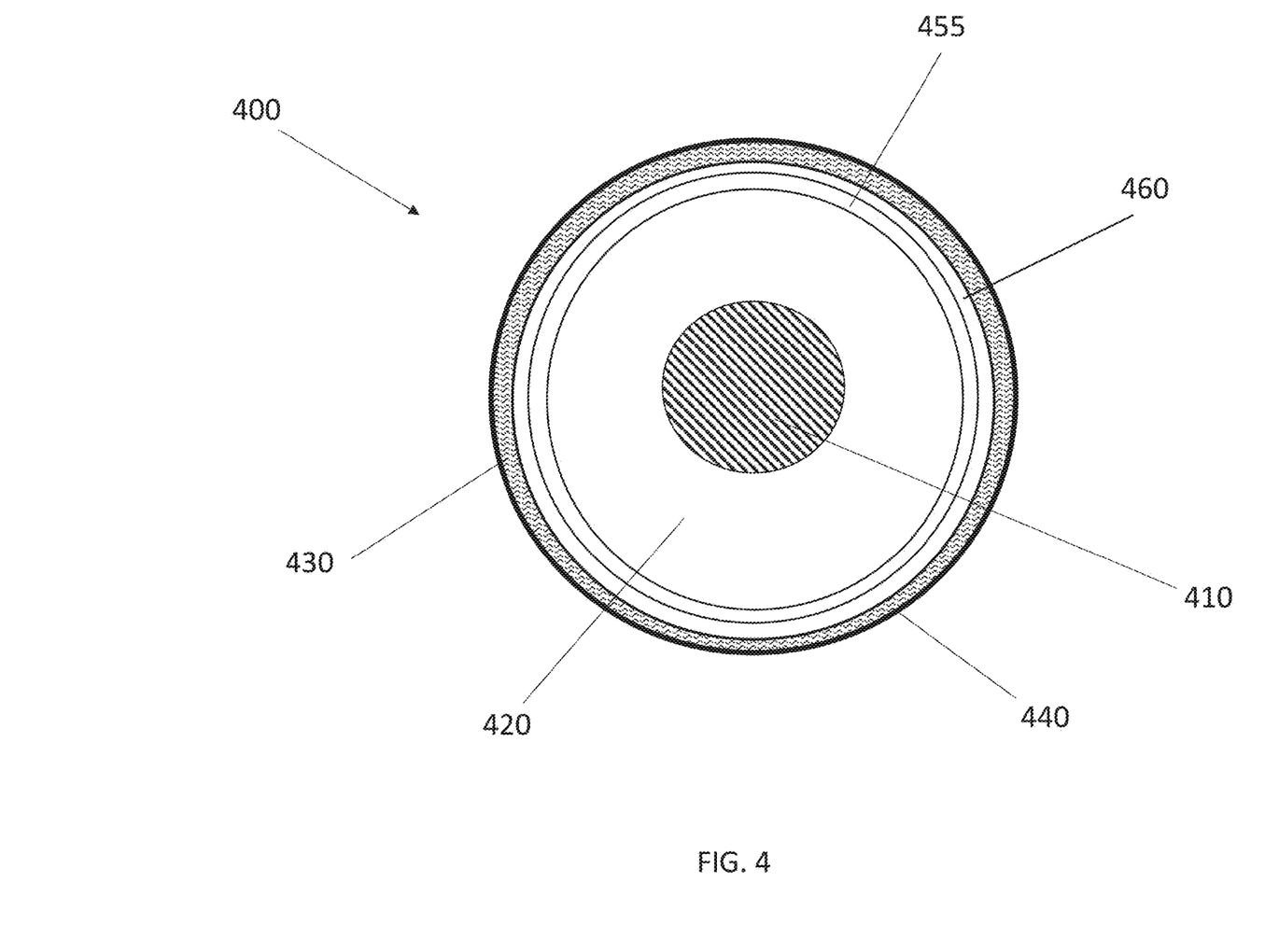
FIG. 4 illustrates a cross-section of an optical fiber in accordance with an embodiment of the invention.

FIG. 4 illustrates a cross-section of an optical fiber 400 in accordance with an embodiment of the invention. The optical fiber 400 is configured to reduce attenuation of the optical fiber 400 by having a secondary metal coating 440 that resists diffusing into the primary metal coating 430, while also preventing cold welding of the optical fiber 400 despite significant changes in temperature. Accordingly, the optical fiber 400 is configured to reduce attenuation thereof.

The optical fiber 400 includes a core 410, a cladding 420, a primary metal coating 430, and a secondary metal coating 440 as described above with regard to FIG. 1. However, unlike the optical fiber 100 of FIG. 1, the optical fiber 400 of FIG. 4 further includes a carbon layer 455 and a seed layer 460 deposited between the cladding 420 and the primary metal coating 430 of the optical fiber 400. The carbon and seed layers 455, 460 are an optional component of the optical fiber 400. The carbon layer 455 is a thin layer of carbon surrounding the cladding 420. The seed layer 460 is a thin layer of palladium, silver, or gold surrounding the carbon layer 455. As discussed above, the carbon layer 455 promote electroless deposition and prevents water ingression, while the seed layer 460 enables electroplating of the fiber.

In addition to the structure of the optical fibers disclosed herein, also disclosed herein are methods of forming these optical fibers. In particular, methods for applying a primary metal coating onto an optical fiber and for applying a secondary metal coating onto a primary metal coating of an optical fiber are disclosed herein. The primary metal coating of an optical fiber can be formed according to any method known to those of skill in the art. For example, in some embodiments, the primary metal coating can be formed over a core and a cladding of an optical fiber via electrodeposition. In alternative embodiments, the primary metal coating can be formed via freezing, i.e., melting/solidification.

Like the primary metal coating, the secondary metal coating can also be formed on the primary metal coating of an optical fiber according to any suitable method known to those of skill in the art. In a preferred embodiment, the secondary metal coating is formed on the primary metal coating via electrodeposition. See, e.g., U.S. Pat. No. 10,126,493, "Method and apparatus for fabrication of metal-coated optical fiber, and the resulting optical fiber", to Miyamoto et al., incorporated herein by reference in its entirety. Specifically, in a preferred embodiment, the secondary metal coating is applied to the primary metal coating of an optical fiber by placing the optical fiber including the core, the cladding, and the primary metal coating surrounding the cladding, into a solution that contains ions of the secondary metal, such that the ionic solution contacts the primary metal coating of the optical fiber. Then, while the ionic solution remains in contact with the primary metal coating of the optical fiber, an electric current is supplied from the solution containing ions of the secondary metal to the primary metal coating of the optical fiber. This supplied electric current causes the ions of the secondary metal to be electrodeposited onto the primary metal coating surrounding the optical fiber, thereby forming a secondary metal coating surrounding the primary metal coating.

As discussed above with regard to FIG. 1, in some embodiments, the melting point of the secondary metal forming the secondary metal coating is higher than the melting point of the primary metal forming the primary metal coating. For example, in certain embodiments the primary metal coating can have a melting point of at least 500 degrees Celsius and the secondary metal coating can have a melting point of at least 900 degrees Celsius. Furthermore, in some embodiments, a thickness of the primary metal coating of the optical fiber is greater than a thickness of the secondary metal coating that is formed around the primary metal coating via electrodeposition. For instance, in certain embodiments, the primary metal coating can have a thickness selected from a range of 0.5 to 45 microns, e.g., 0.5 to 30 microns and the secondary metal coating can have a thickness selected from a range of 0.005 microns to 2 microns. Additionally, in certain embodiments, the primary metal coating can be a noble metal and the secondary metal coating can be a metal containing at least 60 wt % of a noble metal or any alloy thereof.

Forming a secondary metal coating of an optical fiber via electrodeposition provides numerous advantages over traditional methods for forming an optical fiber to reduce attenuation of the optical fiber. For example, as opposed to methods of coating the core/cladding of an optical fiber with a powder (e.g., a talc powder) to reduce attenuation induced by friction of the optical fiber, by electrodepositing a secondary metal coating onto the primary metal coating, the secondary metal coating becomes an integrated component of the optical fiber and cannot be easily displaced. Furthermore, in certain embodiments in which formation of the primary metal coating is also accomplished via electrodeposition, the primary metal coating and the secondary metal coating of the optical fiber can be constructed sequentially according to the same method, thereby enabling seamless manufacture of the optical fiber. Such seamless manufacture of the optical fiber reduces opportunities for error that are more likely to occur with multiple, disjointed manufacturing steps and excessive handling.

Figure 5:
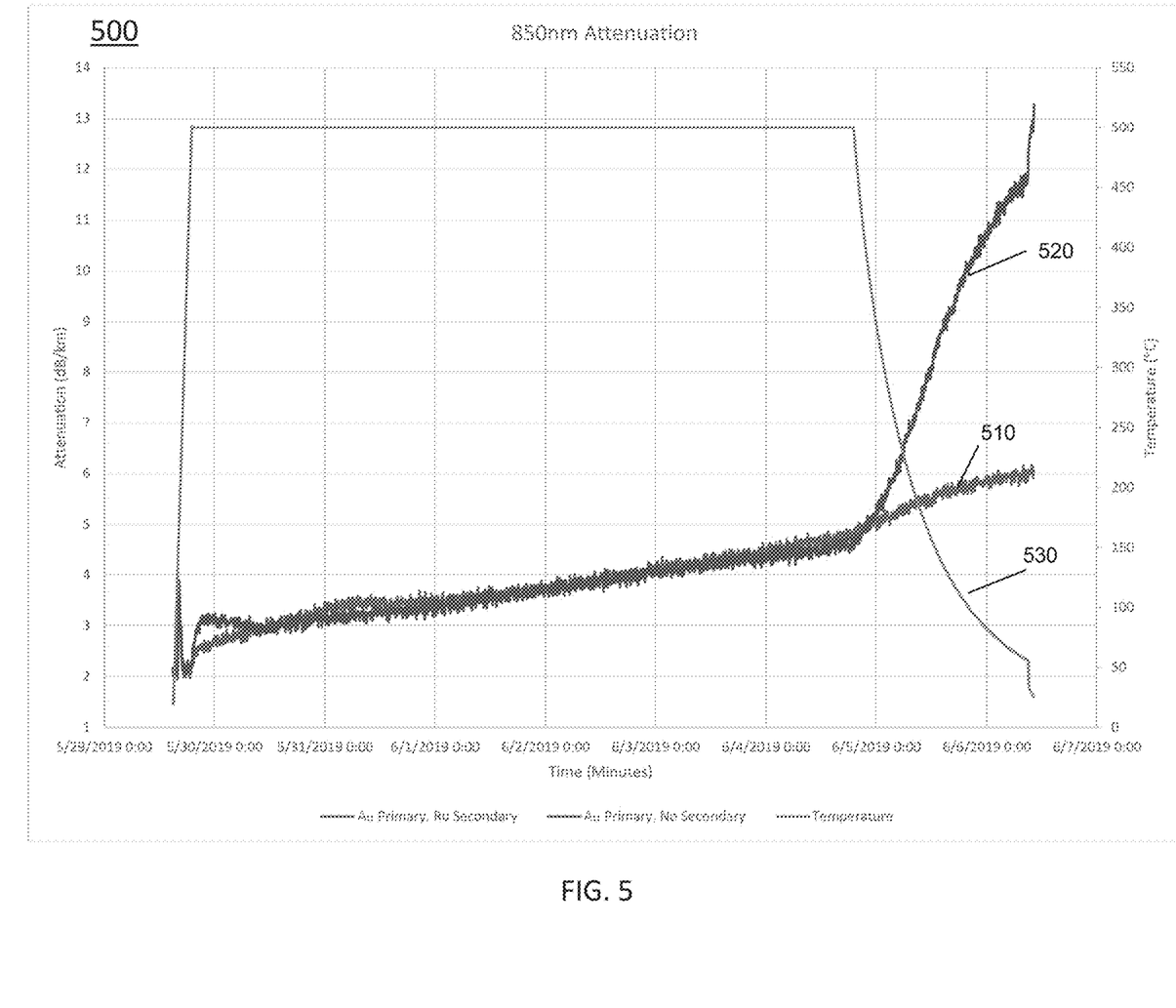
FIG. 5 depicts a graph that compares attenuation of a first optical fiber that includes a primary metal coating of gold and a secondary metal coating of ruthenium to attenuation of a second optical fiber that includes a primary metal coating of gold and no secondary metal coating, in accordance with an embodiment of the invention.

As discussed above, each embodiment of the optical fiber depicted in FIGS. 1-4 is configured to reduce attenuation of the optical fiber by having a secondary metal coating that resists diffusing into the primary metal coating, while also preventing cold welding of the optical fiber despite significant changes in temperature. The secondary metal coating of the optical fiber is important to this reduction in attenuation of the optical fiber. FIG. 5 provides evidence of this importance of the secondary metal coating in attenuation reduction in an optical fiber. Specifically, FIG. 5 depicts a graph 500 that compares attenuation 510 of a first optical fiber that includes a primary metal coating of gold and a secondary metal coating of ruthenium (in accordance with an embodiment of the invention) to attenuation 520 of a second optical fiber that includes a primary metal coating of gold and no secondary metal coating. As shown in FIG. 5, the attenuations of the first and second optical fibers are compared over a 10 day period at temperatures 530 ranging from ambient to 500 degrees Celsius.

As shown in FIG. 5, when the temperature of the optical fibers is decreased from approximately 500 degrees Celsius to ambient between days 8-10 during the 10 day period, attenuation 520 of the second optical fiber that includes only the primary metal coating of gold, but no secondary metal coating, increases dramatically. In contrast, when the temperature of the optical fibers is decreased from approximately 500 degrees Celsius to ambient between days 8-10 during the 10 day period, attenuation 510 of the first optical fiber that includes both the primary metal coating of gold and the secondary metal coating of ruthenium, does not increase dramatically, but rather continues to gradually increase at a constant rate as expected. Therefore, the graph 500 demonstrates the importance of the secondary metal coating of the optical fiber in reducing attenuation of the optical fiber throughout significant changes in temperature.

EXAMPLES

As discussed above with regard to FIG. 1, numerous possible specifications of optical fibers are provided herein. To provide further support for these optical fiber specifications, explicit examples of optical fibers manufactured according to the specifications discussed herein are provided. Specifically, seven distinct examples of optical fibers are provided herein.

A first exemplary optical fiber manufactured according to the specifications discussed herein is a multimode optical fiber having a diameter of 131 μm, a numerical aperture (NA) of 0.2, and including a graded index core with a 50 μm diameter, a cladding with a thickness of 37.5 μm, a primary metal coating of gold with a thickness of 3 μm, and a secondary metal coating of ruthenium with a thickness of 150 angstroms.

A second exemplary optical fiber manufactured according to the specifications discussed herein is a single mode optical fiber having a diameter of 131 μm, a 0.12 NA, and including a step index core with a 9 μm diameter, a cladding with a thickness of 58 μm, a primary metal coating of gold with a thickness of 3 μm, and a secondary metal coating of ruthenium with a thickness of 150 angstroms.

A third exemplary optical fiber manufactured according to the specifications discussed herein is a multimode optical fiber having a diameter of 155 μm, a 0.2 NA, and including a graded index core with a 50 μm diameter, a cladding with a thickness of 37.5 μm, primary metal coating of gold with a thickness of 15 μm, and a secondary metal coating of ruthenium with a thickness of 150 angstroms.

A fourth exemplary optical fiber manufactured according to the specifications discussed herein is a multimode optical fiber having a diameter of 260 μm, a 0.2 NA, and including a graded index core with a 50 μm diameter, a cladding with a thickness of 75 μm, a primary metal coating of gold with a thickness of 30 μm, and a secondary metal coating of ruthenium with a thickness of 150 angstroms.

A fifth exemplary optical fiber manufactured according to the specifications discussed herein is a single mode optical fiber having a diameter of 260 μm and a 0.12 NA and including a step index core with a 9 μm diameter, a cladding with a thickness of 95.5 μm, a primary metal coating of gold with a thickness of 30 μm, and a secondary metal coating of ruthenium with a thickness of 150 angstroms.

A sixth exemplary optical fiber manufactured according to the specifications discussed herein is a multimode optical fiber having a diameter of 260 μm, a 0.22 NA, and including a step index core with a 200 μm diameter, a cladding with a thickness of 10 μm, a primary metal coating of gold with a thickness of 20 μm, and a secondary metal coating of ruthenium with a thickness of 150 angstroms.

A seventh exemplary optical fiber manufactured according to the specifications discussed herein is a multimode optical fiber having a diameter of 131 μm, a 0.275 NA, and including a graded index core with a 62.5 μm diameter, a cladding with a thickness of 31.25 μm, a primary metal coating of gold with a thickness of 3 μm, and a secondary metal coating of ruthenium with a thickness of 150 angstroms.

The above exemplary optical fibers are meant to provide illustrative examples only, and are not inclusive of all possible embodiments of the optical fibers disclosed herein. Specifically, alternative optical fiber configurations that are not explicitly disclosed herein can be provided according to the specifications described throughout this disclosure.

ADDITIONAL CONSIDERATIONS

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, can be made in the arrangement, operation and details of the method and apparatus disclosed herein without departing from the spirit and scope defined in the appended claims.

As will be apparent to those of skill in the art upon reading this disclosure, each of the individual embodiments described and illustrated herein has discrete components and features which can be readily separated from or combined with the features of any of the other several embodiments without departing from the scope or spirit of embodiments of the present invention. Any recited method can be carried out in the order of events recited or in any other order which is logically possible.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, use of the "a" or "an" are employed to describe elements and components of the embodiments herein. This is done merely for convenience and to give a general sense of embodiments of the invention. This description should be read to include one or at least one and the singular also includes the plural unless it is obvious that it is meant otherwise.

What is claimed is:

1. An optical fiber comprising:
a core having a central axis, the core comprising a silica-based glass and having a refractive index;
a cladding surrounding the core, the cladding comprising a silica-based glass and having a refractive index less than the refractive index of the core;
a primary metal coating surrounding the cladding, the primary metal coating comprising a noble metal having a melting point of at least 500 degrees Celsius; and
a secondary metal coating surrounding the primary metal coating, the secondary metal coating having a melting point higher than the melting point of the primary metal coating,
wherein a thickness of the primary metal coating is greater than a thickness of the secondary metal coating.

2. The optical fiber of claim 1, wherein the primary metal coating has a thickness selected from a range of 0.5 microns to 45 microns.

3. The optical fiber of claim 1, wherein the secondary metal coating has a thickness selected from a range of 0.005 microns to 2 microns.

4. The optical fiber of claim 1, wherein the secondary metal coating has a melting point of at least 900 degrees C.

5. The optical fiber of claim 1, wherein the secondary metal coating is porous.

6. The optical fiber of claim 1, wherein the noble metal comprises a metal selected from the group consisting of gold, ruthenium, rhodium, palladium, silver, osmium, iridium, platinum, or any alloy thereof.

7. The optical fiber of claim 1, wherein the secondary metal coating comprises a metal containing at least 60 wt % of a noble metal or any alloy thereof.

8. The optical fiber of claim 1, wherein the primary metal coating has a Vickers hardness of less than or equal to 550 MPa.

9. The optical fiber of claim 1, wherein the secondary metal coating has a Vickers hardness of greater than 220 MPa.

10. The optical fiber of claim 1, wherein the secondary metal coating comprises a metal alloyed with phosphorus.

11. The optical fiber of claim 1, wherein the secondary metal coating comprises a tungsten alloy.

12. The optical fiber of claim 1, wherein the secondary metal coating comprises a metal oxide.

13. The optical fiber of claim 1, wherein the secondary metal coating has a solubility into the primary metal coating of less than 10% at 20 degrees Celsius.

14. The optical fiber of claim 1, further comprising a tubing surrounding the secondary metal coating.

15. A method for fabricating an optical fiber, the method comprising:
placing the optical fiber comprising a core, a cladding surrounding the core, and a primary metal coating surrounding the cladding in a solution containing ions of a secondary metal, the solution contacting the primary metal coating of the optical fiber, a melting point of the secondary metal being higher than a melting point of the primary metal; and
supplying an electric current from the solution containing ions of the secondary metal to the primary metal coating of the optical fiber, thereby electrodepositing the ions of the secondary metal onto the primary metal coating to form a secondary metal coating surrounding the primary metal coating,
wherein (i) the core has a central axis, comprises a silica-based glass, and has a refractive index, (ii) the cladding comprises a silica-based glass and has a refractive index less than the refractive index of the core, (iii) the primary metal coating comprises a noble metal having a melting point of at least 500 degrees Celsius, (iv) the secondary metal coating has a melting point higher than the melting point of the primary metal coating, and (v) a thickness of the primary metal coating is greater than a thickness of the secondary metal coating.

16. The method of claim 15, wherein the primary metal coating has a thickness selected from a range of 0.5 microns to 45 microns.

17. The method of claim 15, wherein the secondary metal coating has a thickness selected from a range of 0.005 microns to 2 microns.

18. The method of claim 15, wherein the secondary metal coating has a melting point of at least 900 degrees C.

19. The method of claim 15, wherein the secondary metal coating comprises a metal containing at least 60 wt % of a noble metal or any alloy thereof.

* * * * *